US 6,657,760 B2

(12) United States Patent
Fukita et al.

(10) Patent No.: US 6,657,760 B2
(45) Date of Patent: Dec. 2, 2003

(54) IMAGE SCANNING APPARATUS

(75) Inventors: Taku Fukita, Susono (JP); Kenichi Tomita, Numazu (JP); Hideyuki Miyamoto, Numazu (JP); Michiyo Fukutomi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/750,169

(22) Filed: Dec. 29, 2000

(65) Prior Publication Data
US 2001/0021057 A1 Sep. 13, 2001

(30) Foreign Application Priority Data
Jan. 14, 2000 (JP) ........................... 2000-006729
Jul. 31, 2000 (JP) ........................... 2000-230760

(51) Int. Cl.[7] .............................................. G02B 26/08
(52) U.S. Cl. .................................................. 359/205
(58) Field of Search ................... 359/196, 197, 359/198, 205, 206, 207, 210, 819; 235/462.32

(56) References Cited

U.S. PATENT DOCUMENTS

| 5,751,462 | A | * | 5/1998 | Shiraishi et al. ............ 359/204 |
| 5,774,282 | A | * | 6/1998 | Kohmoto et al. ........... 359/823 |
| 5,808,774 | A | * | 9/1998 | Kawabata ................... 359/210 |
| 6,283,371 | B1 | * | 9/2001 | Son ......................... 235/462.32 |

FOREIGN PATENT DOCUMENTS

| JP | 9-159944 | 6/1997 |
| JP | 11-190822 | 7/1999 |

* cited by examiner

*Primary Examiner*—Euncha Cherry
(74) *Attorney, Agent, or Firm*—Fitzpatrick, Cella, Harper & Scinto

(57) ABSTRACT

The present invention provides an image scanning apparatus that has deflection device for deflecting a light flux emitted from a light emitting source a lens for guiding the light flux deflected by the deflection device to a surface to be scanned, and a holding base for holding the lens, the holding base being provided with a recess portion wherein the lens has a curved surface portion on a lower face thereof, and the holding base holds the curved surface portion of the lens by the recess portion.

5 Claims, 14 Drawing Sheets

IMAGE SCANNING APPARATUS

BACKGROUND OF THE INVENTION

1. Field of the Invention

The present invention relates to an image scanning apparatus adapted for use as an image input device for a printer, a copying apparatus or the like.

2. Related Background Art

The scanning apparatus of this kind is generally constructed that laser light emitted from a light source unit is condensed through a cylindrical lens into a linear form on a reflecting face of a polygon mirror of a deflecting device and is deflected into a scanning motion by the rotation of the polygon mirror, and is focused through an Fθ lens onto the surface to be scanned of a photosensitive member in the form of a rotary drum, serving as the image bearing member.

In such mechanism, if the Fθ lens is uneven in shape or is deviated in its mounting position, there will result a bending in the scanning line on the surface to be scanned or a biased magnification which is the difference between the lengths of the left and right half portions in the main scanning direction. Such bending of the scanning line or the biased magnification is permissible in case of forming a monochromatic image unless such bending or biased magnification becomes extremely large, but is not acceptable in case of forming a color image because plural scanning lines are to be superposed. More specifically, in order to form a high definition color image, it is required to reduce the bending of the scanning line and the biased magnification thereby reducing the displacement between the scanning lines of different colors.

Also in case a color image is formed by superposing images of each color on the surface to be scanned utilizing a single deflecting scanning apparatus and a single image bearing member, the bending of the scanning line and the biased magnification appear similarly in the each color, so that the out of color registration is retained within a certain extent. However, in case of forming a color image at a high speed by combining plural scanning apparatus and plural image bearing members, the bending of the scanning line and the biased magnification appear differently among different scanning apparatus so that the scanning lines of each color are mutually displaced even if they are registered in the sub scanning direction. It is therefore extremely difficult to form a high definition color image in such case.

On the other hand, light scanning apparatus for resolving such drawbacks are disclosed in the Japanese Patent Applications Laid-open Nos. 9-159944 and 11-190822. In the former, a transparent parallel-faced flat plate is added between the imaging lens and the image bearing member and is rotated about the longitudinal axis to correct the bending of the scanning line. In the latter, rod-shaped projections provided on both ends of the scanning lens and a central portion of the scanning lens are respectively pressed toward a V-shaped groove and a supporting pillar by an elastic member to suppress the positional displacement of the scanning resulting from the thermal expansion of the scanning lens.

However, in the scanning apparatus proposed in the Japanese Patent Application Laid-open No. 9-159944, the manufacturing cost is elevated because of the addition of the parallel-faced flat plate between the imaging lens and the image bearing member, and the biased magnification of the scanning line cannot be corrected.

Also in the scanning apparatus proposed in the Japanese Patent Application Laid-open No. 11-190822, as the elastic member is present within the effective image area of the scanning lens and presses the central portion thereof, the lens surface may be distorted to deteriorate the image. Also the entire length of the lens becomes larger because the rod-shaped projections are formed on both longitudinal ends of the lens. Consequently, in case the lens is molded with a plastic material, there may result a longer tact time of molding, a deteriorated precision of the lens surface or the diffracting surface or a reduced number of molded objects (articles) produced at a time from the mold, thus detrimentally affecting the manufacturing cost and the optical performance of the scanning lens. Furthermore, the biased magnification of the scanning line cannot be corrected as the adjustment of the scanning lens in the longitudinal direction is not considered.

SUMMARY OF THE INVENTION

In consideration of the foregoing, an object of the present invention is to provide an image scanning apparatus comprising:

deflection means for deflecting a light flux emitted from a light emitting source;

a lens for guiding the light flux deflected by the deflecting means to a surface to be scanned; and a holding base for holding the lens, the holding member being provided with a recess portion;

wherein the lens has a curved surface portion on a lower face thereof and the holding base holds the curved surface portion by the recess portion.

Another object of the present invention is to provide an image scanning apparatus comprising:

deflection means for deflecting a light flux emitted from a light emitting source;

a lens for guiding the light flux deflected by the deflecting means to a surface to be scanned;

a holding member for holding the lens; and a holding base for holding the holding member, the holding base being provided with a recess portion;

wherein the holding member has a curved surface portion and the holding base holds the curved surface portion of the holding member by the recess portion.

Still another object of the present invention is to provide an image scanning apparatus comprising:

deflection means for deflecting a light flux emitted from a light emitting source;

a lens for guiding the light flux deflected by the deflecting means to a surface to be scanned;

a first holding base for holding the lens; and a second holding base for holding the lens by adhesion, the second holding base being vertically movable.

Still other objects of the present invention, and the features thereof, will become fully apparent from the following detailed description which is to be taken in conjunction with the accompanying drawings.

DETAILED DESCRIPTION OF THE PREFERRED EMBODIMENTS

Now the present invention will be clarified in detail by preferred embodiments, with reference to the accompanying drawings.

Figure 1:
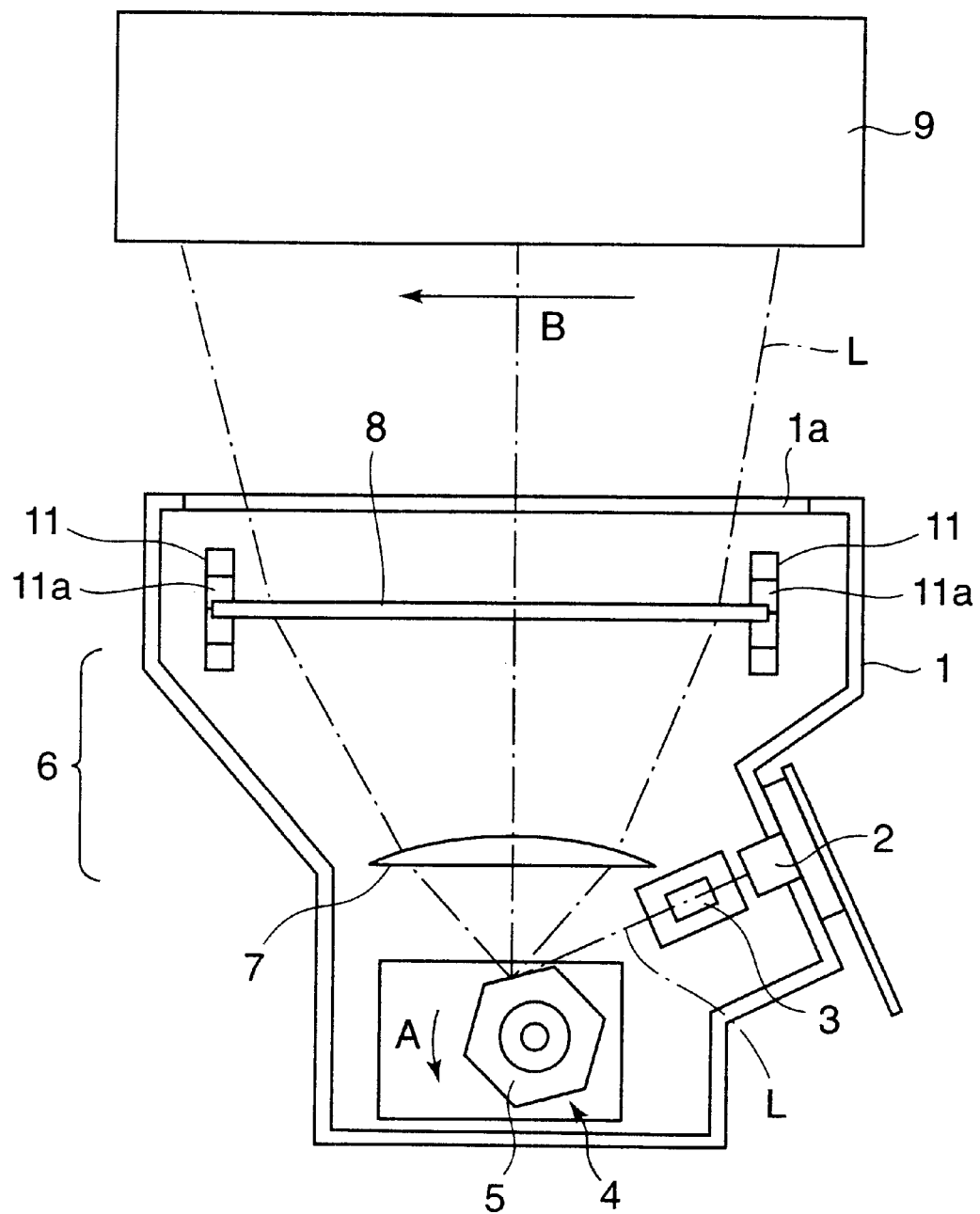
FIG. 1 is a plan view of a first embodiment.

FIG. 1 is a plan view of a first embodiment, wherein, in an optical casing 1, a light source unit 2 is mounted, and a cylindrical lens 2 and a light deflector 4 are positioned in succession in the proceeding direction of a laser light beam L emitted from the light source unit 2. In the light deflector 4 there is held a polygon mirror 5 rotatably in a direction A, and, in the proceeding direction of the laser light L deflected by the polygon mirror 5 there are provided a refracting optical element 7 constituting a refracting portion of an fθ lens 6 and a diffraction optical element 8 constituting a diffracting portion the fθ lens 6 both in the optical casing 1, and a rotary drum 9 constituting an image bearing member outside the optical casing 1.

The laser light L emitted from the light source unit 2 is transmitted by the cylindrical lens 3 and condensed in a linear shape on the reflecting face of the polygon mirror 5, and is deflected into scanning motion by the reflecting faces of the rotating polygon mirror 5. The deflected laser light L is transmitted by the refracting optical element 7 and the diffracting optical element 8 constituting the fθ lens 6, thereby being focused, through an exit aperture 1a of the optical casing 1, onto a photosensitive member on the rotary drum 9 in a scanning motion in a main scanning direction B.

Figure 2:
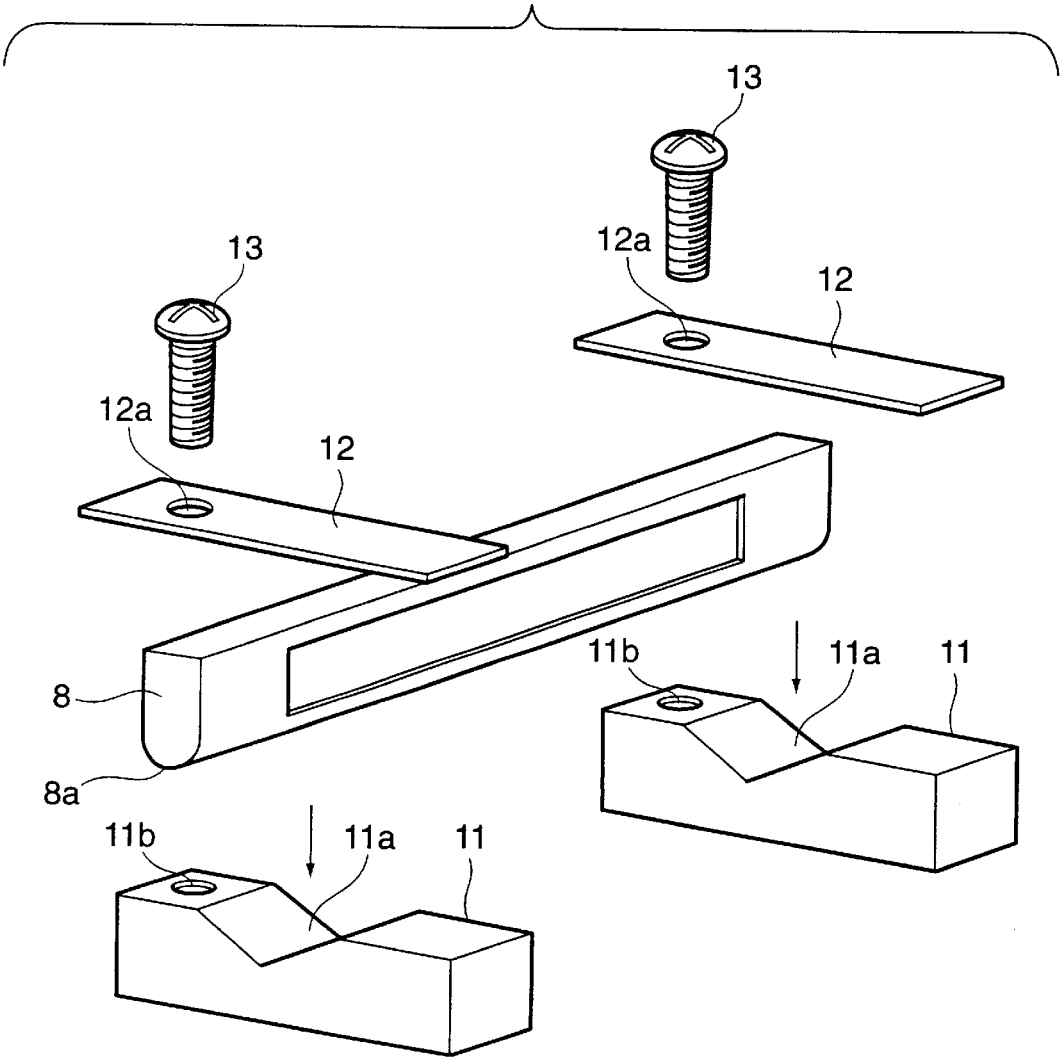
FIG. 2 is an exploded perspective view of a diffraction optical element and its neighborhood.

FIG. 2 is an exploded perspective view of the diffracting optical element 8 and related components, showing an adjusting mechanism allowing to adjust the position of the diffracting optical element 8. The diffracting optical element 8 is composed for example of a plastic material, and the bottom face thereof is composed of a curved surface portion 8 with an arc-shaped cross section. In the optical casing 1 there is provided a pair of holding bases 11 for respectively holding the longitudinal ends of the diffracting optical element 8, and the holding base 11 is provided, at the approximate center of the upper face thereof, with a recess portion 11a for example of V-shaped cross section for accommodating the curved surface portion 8a of the diffracting optical element 8 and, at a side of the recess portion 11a on the upper face, with a threaded hole 11b.

In mounting the diffracting optical element 8 in the optical casing 1, the diffracting optical element 8 is placed on the holding bases 11 in such a manner that the curved surface portion 8a of the diffracting optical element 8 is accommodated in the recess portions 11a. Then plate springs 12 are positioned on the upper face of the diffracting optical element 8, and screws 13 are fitted into the threaded holes 11b of the holding bases 11 through penetrating holes 12a of the plate springs 12, whereby the plate springs 12 press and hold the diffracting optical element 8 so as to enable rocking motion.

Figure 3:
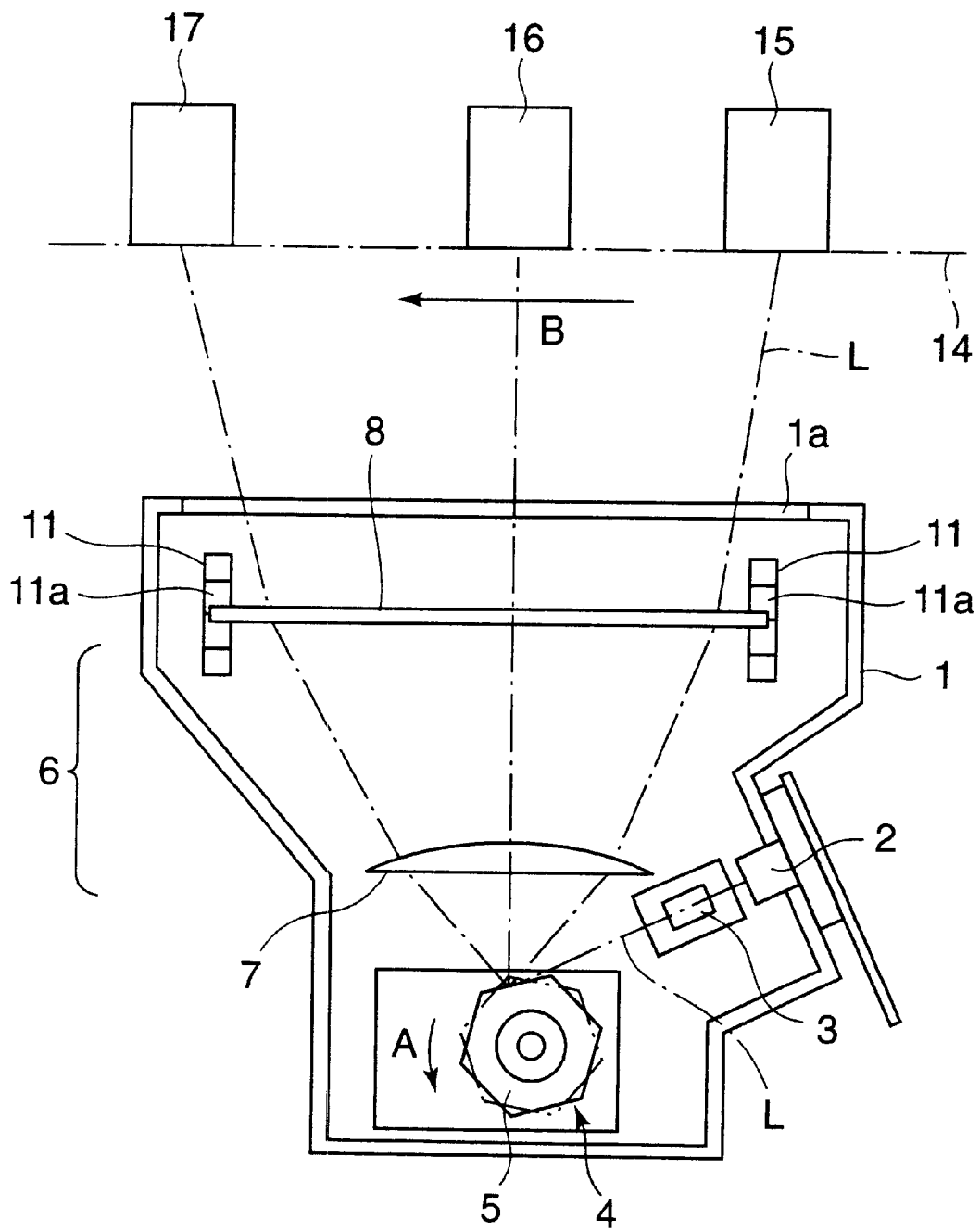
FIG. 3 is a view showing a method for measuring the biased (deviated) magnification and bending of the scanning line.

FIG. 3 is a plan view showing a method of measuring the biased magnification and the bending of the scanning line. Photosensors 15, 16, 17 for detecting the laser light L are provided in positions corresponding to the surface to be scanned of the rotary drum 9, and the photosensor faces of the photosensors 15, 16, 17 are made to coincide with the surface to be scanned 14.

Figure 4:
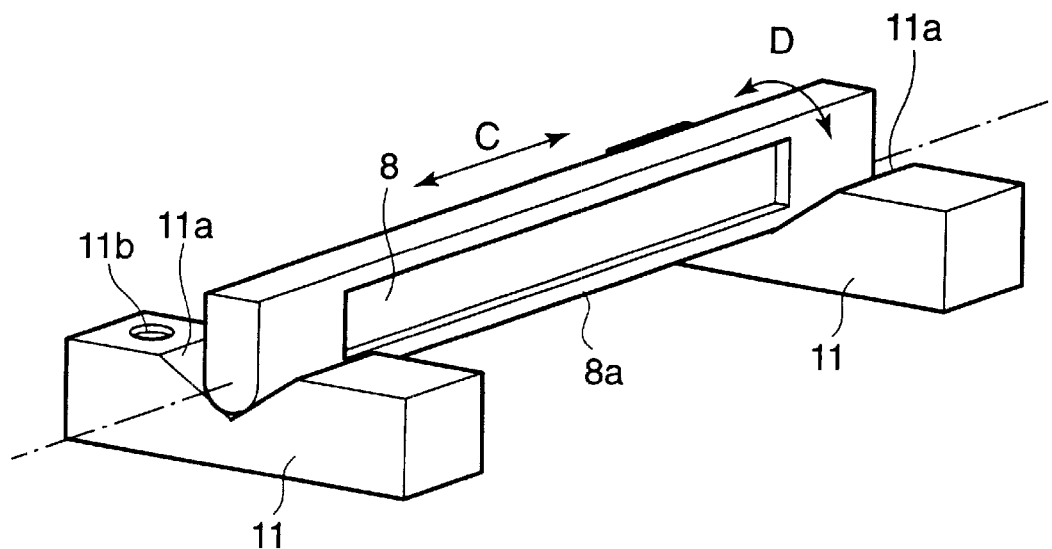
FIG. 4 is a view showing the adjusting directions for the diffraction optical element.

In case of measuring the biased magnification of the scanning line, there are measured time required by the laser light L for scanning the distance between the sensors 15 and 16 and that for scanning the distance between the sensors 16 and 17. Then these times are compared to determine the difference in the lengths of the scanning line at the left-hand side and the right-hand side with respect to the center of the scanning line in the main scanning direction on the surface to be scanned 14, namely the biased magnification. Then, as shown in FIG. 4, the diffracting optical element 8 is moved in a direction C along the longitudinal axis thereof in such a manner that the biased magnification becomes same in the left-hand side and the right-hand side.

On the other hand, in case of correcting the bending of the scanning line, it is measured by detecting the position in height of the laser light L entering the photosensors 15, 16, 17, utilizing line sensors arranged vertically therein. Then the diffracting optical element 8 is rotated in a direction D about the longitudinal axis thereof so as to reduce the bending of the scanning line. The rotating direction of the diffracting optical element 8 need not, however, to be particularly specified.

After the correction of the biased magnification and bending of the scanning line, the position of the diffracting optical element 8 can be retained by the pressure of the plate springs 12. However, the position of the diffracting optical element 8 can be more securely retained by fixing the diffracting optical element 8 to the holding bases 11 or to the plate springs 12 with an adhesive.

In the first embodiment, as explained in the foregoing, the bottom face of the diffracting optical element 8 constituting a part of the fθ lens 6 is composed of a curved surface portion 8a and such curved surface portion 8a is held by the recess portions 11a of the holding base 11, whereby the diffracting optical element 8 can be smoothly moved linearly in the direction C along the longitudinal axis thereby enabling to correct the biased magnification of the scanning line, and can also be smoothly rotated in the direction D about the longitudinal axis to adjust the bending of the scanning line. It is thus rendered possible to easily adjust the biased magnification and bending of the scanning line and to dispense with the conventionally required parallel-faced flat plate, thereby allowing to reduce the manufacturing cost. Also it is not required to press the central portion of the diffracting optical element 8 in contrast to the conventional configuration, whereby the diffracting optical element 8 is not distorted and the image quality can therefore be improved.

Besides, as the diffracting optical element 8 is composed of a plastic material, the diffracting optical element 8 has a high freedom in the shape including the curved surface portion 8a and does not require finishing work, so that the manufacturing cost can be further reduced. Also the diffracting optical element 8 can be reduced in the entire length thereof, since the rod-shaped projections conventionally required on both ends are no longer present. It is therefore rendered possible to reduce the tact time in the molding operation, to improve the precision of the diffracting face and to increase the number of moldings obtained at a time from the mold, thereby improving the manufacturing cost and the optical performance.

In the foregoing first embodiment, the diffracting optical element 8 is composed of a plastic material, but the biased magnification and bending of the scanning line can be easily adjusted even in case the element 8 is composed of other materials. Also the recess portion 11a of the holding base 11 is formed with a substantially V-shaped cross section, but it may also be formed with a substantially U-shaped cross section. It is furthermore possible to retain the position of the diffracting optical element 8 by providing another adjusting mechanism for adjusting the position of the diffracting optical element 8 in the C and D directions and fixing such adjusting mechanism after the adjustment of the position of the diffracting optical element 8.

Figure 5:
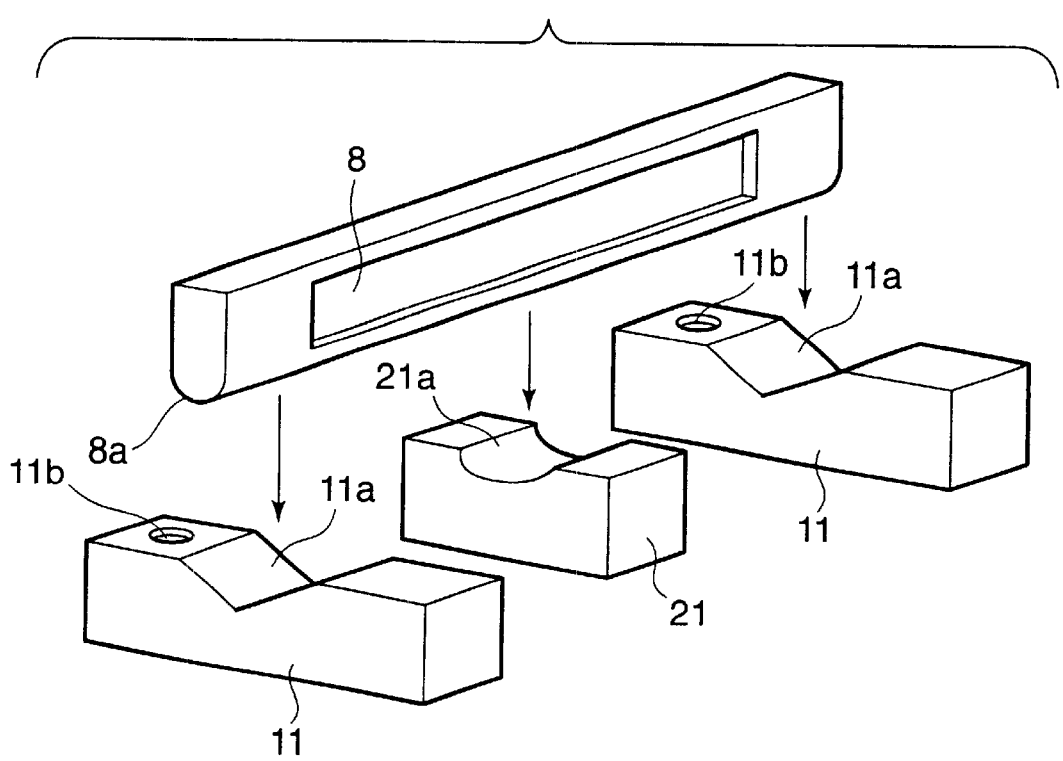
FIG. 5 is an exploded perspective view of a diffraction optical element and related components in a second embodiment.

FIG. 5 is an exploded perspective view of the diffracting optical element 8 and related components in a second embodiment, wherein an adhesion base (second holding base) 21 for fixing the diffraction optical element 8 by adhesion is added between the holding bases 11 at left and right. The adhesion base 21 is provided in a position capable of fixing, by adhesion, the approximate longitudinal center of the diffracting optical element 8, and is provided, on the upper face, with a recess portion 21a for example of U-shape for accommodating the curved surface portion 8a of the diffracting optical element 8.

Figure 6:
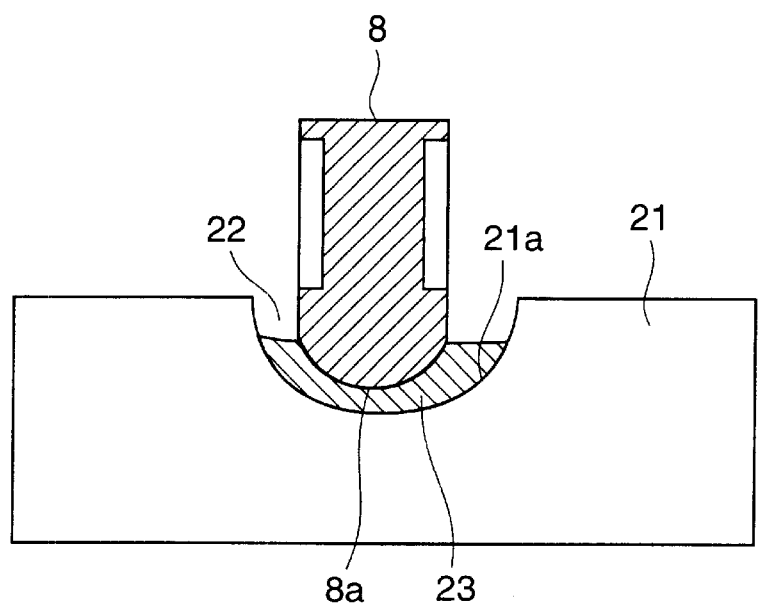
FIG. 6 is a partial cross-sectional view showing the relationship between the diffraction optical element and an adhesion base.

As shown in a partial cross-sectional view in FIG. 6, in a state in which the curved surface portion 8a of the diffracting optical element 8 is accommodated in the recess portion 21a of the adhesion base 21, a gap 22 is present between the recess portion 21a of the adhesion base 21 and the curved surface portion 8a of the diffracting optical element 8 and is filled with an adhesive 23.

Figure 7:
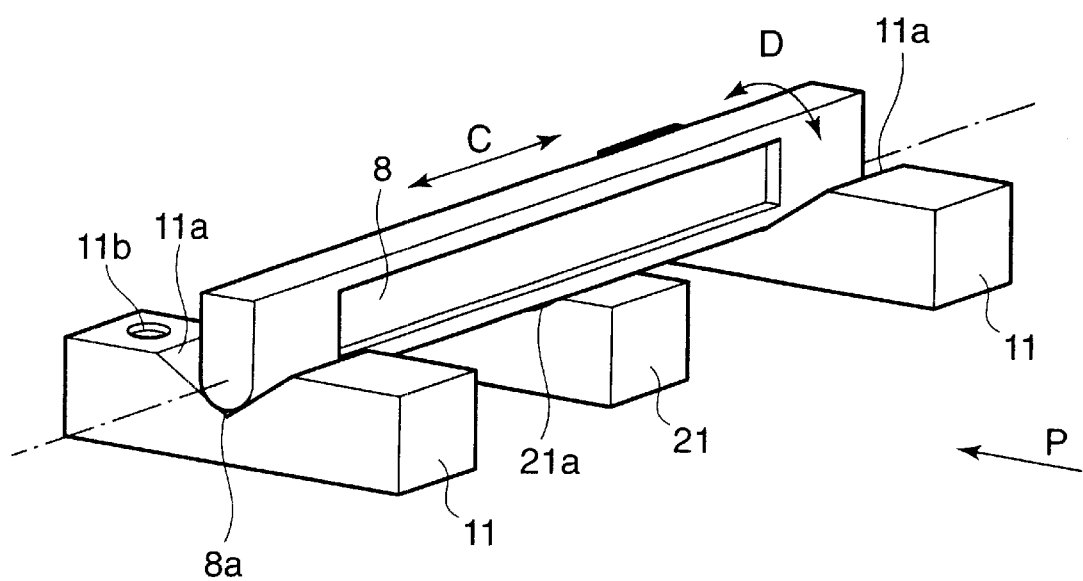
FIG. 7 is a view showing the adjusting directions for the diffraction optical element.

In adjusting the biased magnification and bending of the scanning line, a UV-settable adhesive is filled in advance in the gap 22 and the position of the diffracting optical element 8 is adjusted in the same manner as in the first embodiment. More specifically, as shown in FIG. 7, the biased magnification of the scanning line is adjusted by the linear movement in the direction C of the diffracting optical element 8 and the bending of the scanning line is adjusted by the rotating movement in the direction D of the diffracting optical element 8. Subsequently the adhesive 23 is irradiated with ultraviolet light from above the diffracting optical element 8, whereby the adhesive 23 is hardened to fix the diffracting optical element 8 to the adhesive base 21.

Figure 13:
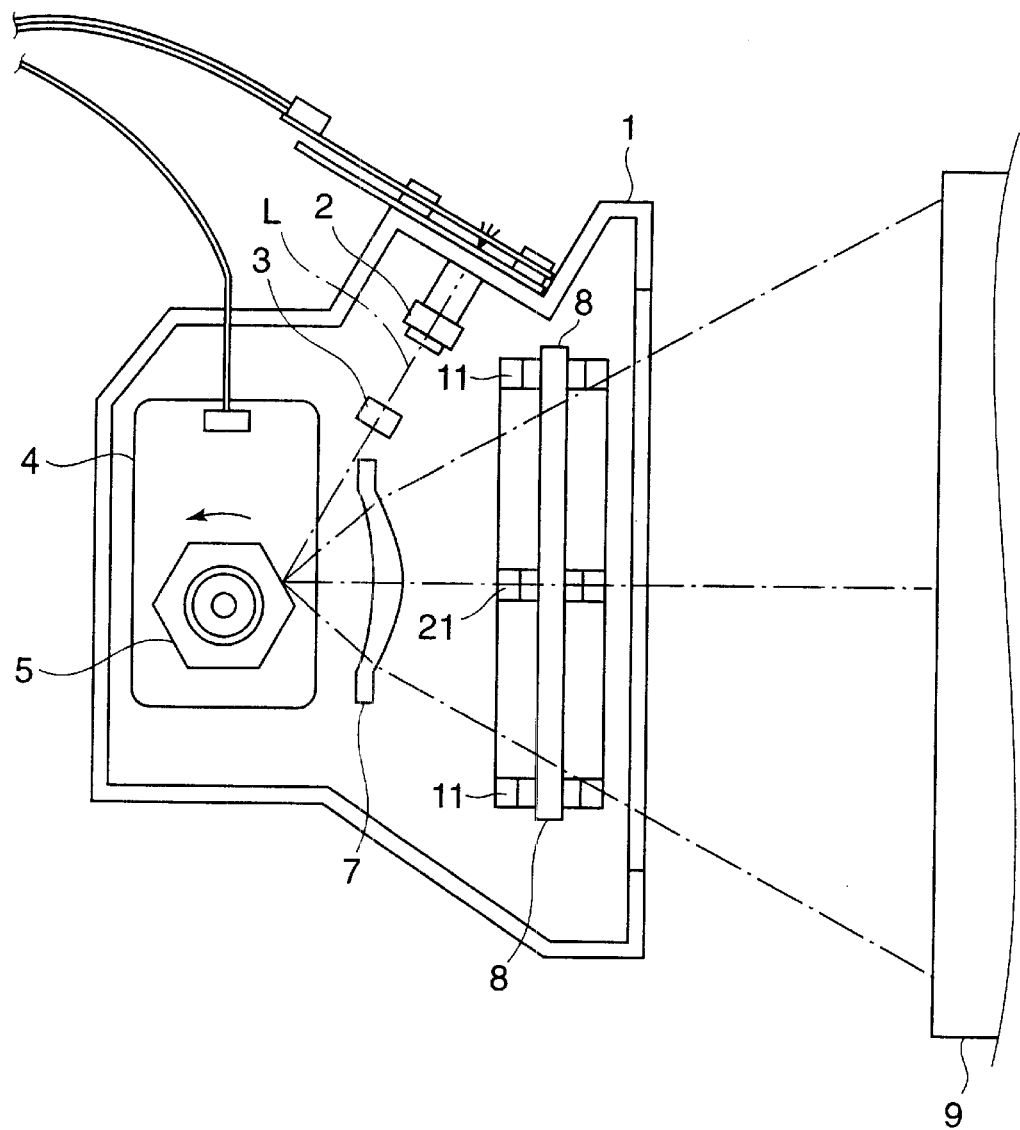
FIG. 13 is a plan view of the second embodiment.
Figure 14:
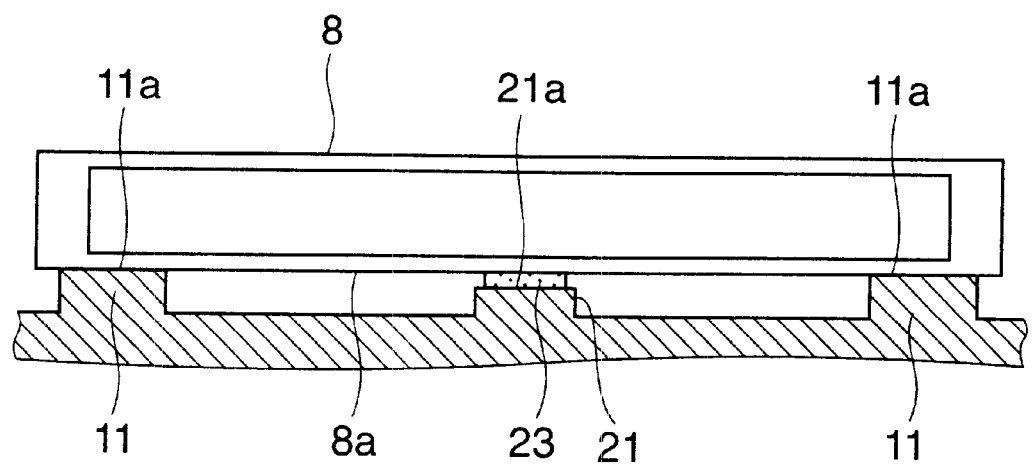
FIG. 14 is a transversal cross-sectional view of an optical casing in the vicinity of the diffraction optical element in the second embodiment.

The above-described second embodiment, dispensing with the plate springs 12 and the screws 13 required in the first embodiment, allows to reduce the manufacturing cost. Also as the approximate longitudinal center of the diffracting optical element 8 is fixed by adhesion, it extends equally to the right and to the left in case it thermally expands, whereby the biased magnification of the scanning line can be made uniform in the optical designing on the surface to be scanned 14. Further, by making the gap 22 uniform between the diffracting optical element 8 and the adhesion base 21, the adhesive 23 uniformly shrinks in the setting operation so that the position of the diffracting optical element 8 is not disrupted. In the foregoing description, the adhesion base 21 is provided only in one position, but it is also possible to provide the adhesion bases in two or more positions corresponding to the approximate center of the diffracting optical element 8 along the main scanning direction. FIG. 13 is a plan view of the present embodiment, and FIG. 14 is a cross-sectional view thereof seen from a direction P shown in FIG. 7.

Figure 8:
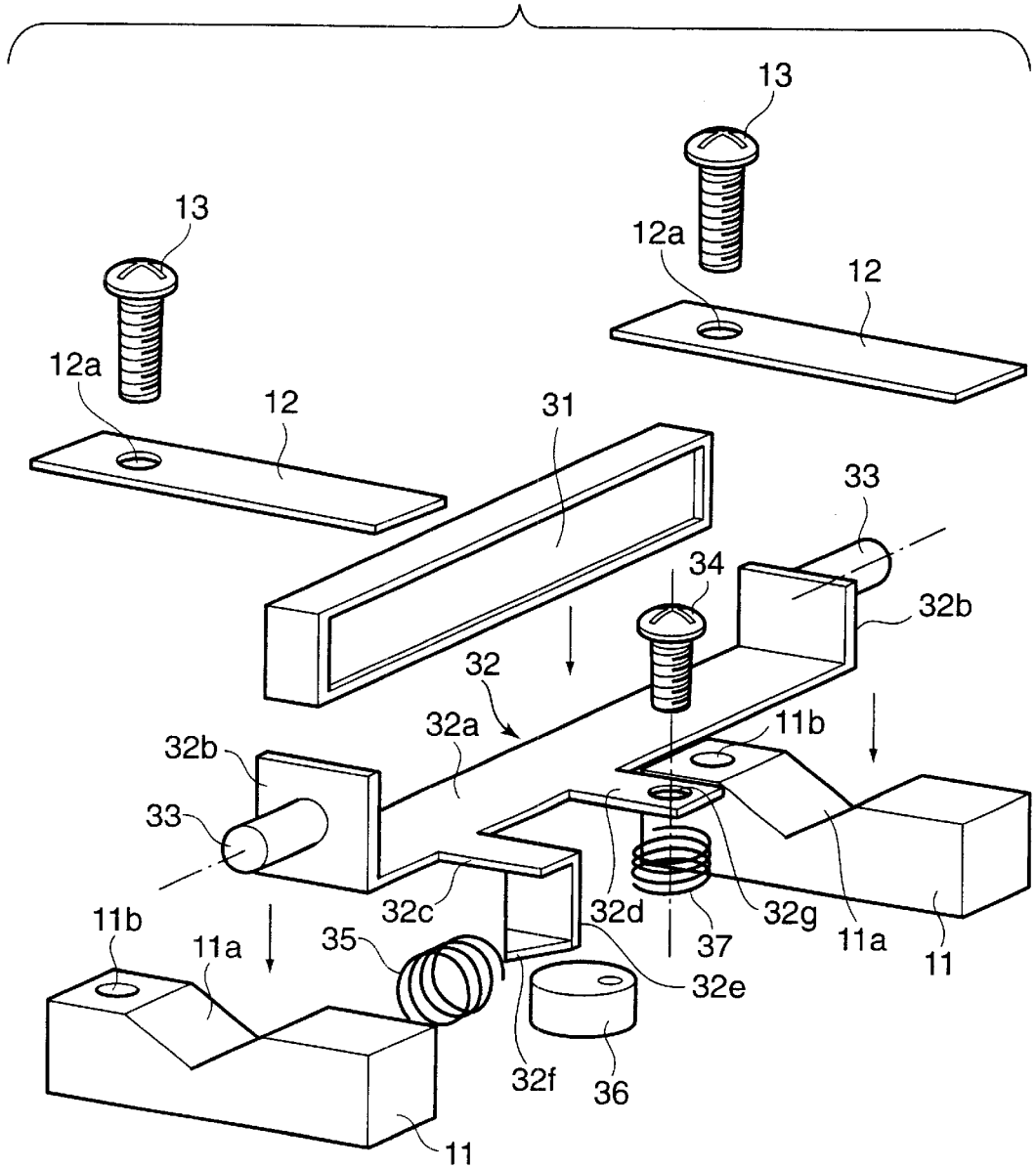
FIG. 8 is an exploded perspective view of a diffraction optical element and its neighborhood in a third embodiment.

FIG. 8 is an exploded perspective view of a diffracting optical element 31 and related components in a third embodiment, in which the diffracting optical element 31 has a flat bottom face and is fixed for example by adhesion to a holding member 32 composed of a metal plate. On the left and right sides of the holding member 32, shafts 33 consisting of cylindrical pins, formed separately, are provided on the longitudinal axis of the diffracting optical element 31, and the shafts 33 are fixed to the holding member 32 for example by pressing. The shafts 33 are held by the recess portions 11a of the holding bases 11 and are pressed as in the first embodiment by the plate springs 12 which are fixed to the holding bases 11 by the screws 13, whereby the holding member 32 is rendered capable of rocking motion.

The holding member 32 is provided with a horizontal holding portion 32a for holding the bottom face of the diffracting optical element 32, left and right vertical holding portions 32b standing vertically from the end edges of the horizontal holding portion 32a for holding the end faces of the diffracting optical element 31, and a biased magnification adjusting portion 32c protruding horizontally from a lateral edge of the horizontal holding portion 32a, and a bending adjusting portion 32d protruding parallel to the biased magnification adjusting portion 32c. The biased magnification adjusting portion 32d is provided with a vertical portion 32e extending downwards and a horizontal portion 32f, and the bending adjusting portion 32d is provided with a hole 32g for passing a screw 34.

Figure 9:
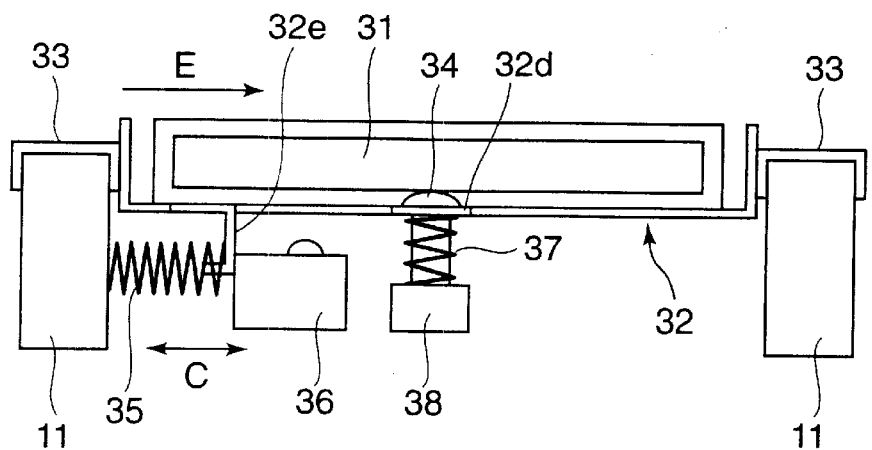
FIG. 9 is an elevation view of an assembly without a plate spring.
Figure 10:
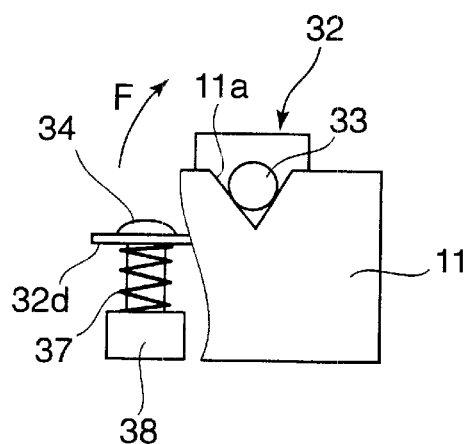
FIG. 10 is a lateral view of the assembly without the plate spring and a holding base.

FIG. 9 is an elevation view showing an assembled state without the plate springs 12, and FIG. 10 is a lateral view of the assembled state in which the plate springs 12 are excluded and the holding base 11 is partially cut off. A first compression spring 35 is provided between a holding base 11 and the biased magnification adjusting portion 32c of the holding member 32 whereby the holding member 32 is biased in a direction E. An eccentric cam 36 is provided on the opposite side of the first compression coil spring 35, across the vertical portion 32e of the biased magnification adjusting portion 32c, and is rendered capable of driving the holding member 32 in a direction opposite to the direction E against the biasing force of the first compression coil spring 35.

Under the bending adjusting portion 32d of the holding member 32, there is provided a second compression coil spring 37 which is supported, via a screw 34, on a spring holding base 38 provided at the approximate center of the left and right holding bases 11. The screw 34 is fitted into the spring holding base 38 through the hole 32g of the bending adjusting portion 32d of the holding member 32 and through the interior of the second compression coil spring 37, whereby the holding member 32 is biased by the second compression coil spring 37 in a direction F.

In adjusting the biased magnification, the eccentric cam 36 is rotated for example by a jig, thereby moving the holding member 32 in the direction C along the longitudinal axis of the diffracting optical element 31. After the adjustment of the biased magnification of the scanning line, the eccentric cam 36 is fixed for example by adhesion or with a screw to retain the position of the diffracting optical element 8.

Also in adjusting the bending of the scanning line, the screw 34 is rotated for example by a jig, whereby the diffracting optical element 31 on the holding member 32 is rotated in the direction F. Thereafter the position of the holding member 32 can be retained by the tightening of the screw 34, but it is also preferable to fix the screw 34 for example by adhesion.

In the present third embodiment, the diffracting optical element 31 is held by the holding member 32 while the shafts 33 of the holding member 32 are supported by the holding base 11 of the optical casing movably in the direction C and rotatably in the direction F, so that the biased magnification and bending of the scanning line can be corrected by adjusting the position of the holding member 32. Also in adjusting and fixing the position of the diffracting optical element 31, the diffracting optical element 31, not being subjected to any direct external force, is not distorted so that the image is not deteriorated. Furthermore, as the holding member 32 is composed of a metal plate, the shafts 33 can be easily assembled to the holding member 32 and it can be formed with a high strength.

In the foregoing description, the diffracting optical element 31 is fixed to the holding member 32 by adhesion, but other fixing means such as a spring may also be employed. Also the holding member 32 is composed of a metal plate, but such configuration is not restrictive. Also the shafts 33 consisting of separately formed pins are fixed to the holding member 32 by pressing, but fixing for example by caulking or adhesion can also be adopted.

Further, the shafts 33 are assembled as separate members to the holding member 32, but they can be formed integrally with the holding member 32. Also the shafts 33 are formed with a cylindrical shape, but they may also be formed as a semi-cylindrical shape as long as a curvature is present in the contact surface portion with the recess portion 11a.

Figure 11:
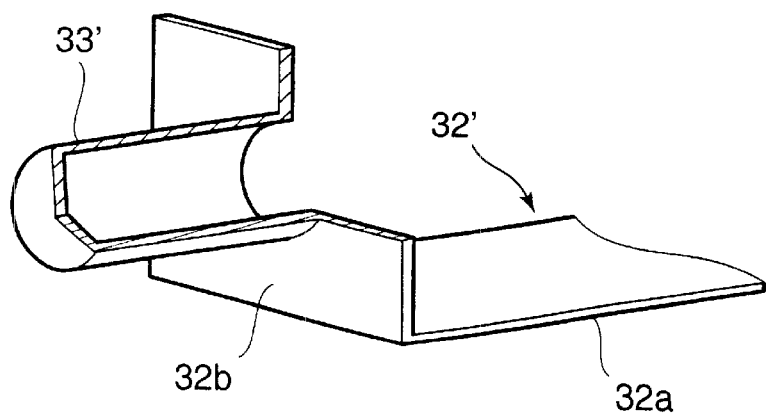
FIG. 11 is a partially broken perspective view showing a variation of a curved surface portion.
Figure 12:
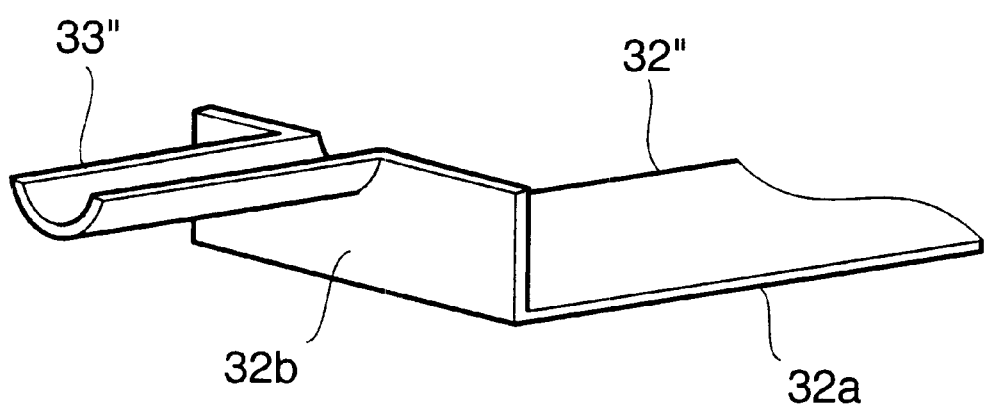
FIG. 12 is a partial perspective view of a variation of the curved surface portion.

For example, as shown in a partially broken perspective view in FIG. 11, a shaft portion 33' can be formed, by deep drawing, in a cylindrical shape integrally in the vertical holding portion 32b of the holding member 32' composed of a metal plate. Also as shown in a partial perspective view in FIG. 12, a semi-cylindrical shaft portion 33" may be integrally formed by press working on the vertical holding portion 32b of the holding member 32" composed of a metal plate simultaneous with the bending work thereof. In such cases, it is not necessary to prepare the separate pins and to fix them to the holding member 32, whereby the manufacturing cost of the holding member 33' or 33" can be reduced and the strength thereof can be improved.

In the foregoing first to third embodiments, the diffraction optical element 8, 31 can be replaced by another aspherical lens constituting the fθ lens 6. Also the diffracting optical element 8, 31 need not necessarily be positioned in the optical casing 1 but may be directly provided for example on a stay of the image forming apparatus. Also the holding base or adhesion base 11, 21, 38 may naturally be formed integrally with the optical casing 1.

In the following there will be explained still other embodiments of the present invention.

Figure 15:
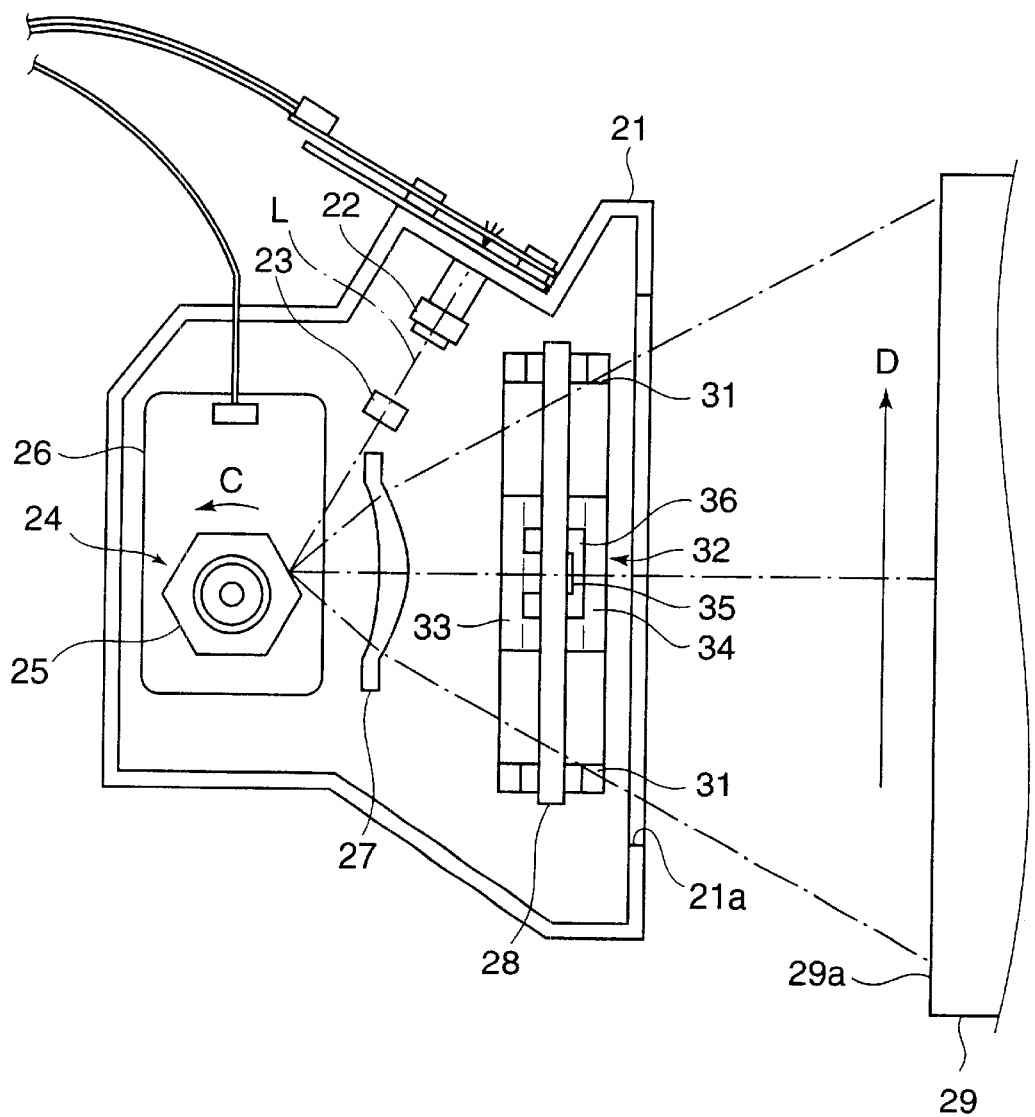
FIG. 15 is a plan view of a fourth embodiment.

FIG. 15 is a plan view of the fourth embodiment, wherein, in an optical casing 21, a light source unit 22 for emitting a laser light L is mounted. In the optical casing 21, a cylindrical lens 23 and a light deflector 24 are positioned in succession in the proceeding direction of the laser light beam L emitted from the light source unit 22. The light deflector 24 is composed of a polygon mirror 25 and a motor holding the polygon mirror 25 rotatably in a direction C. In the proceeding direction of the laser light L deflected by the polygon mirror 25 there are provided a refracting optical element 27 constituting a refracting portion of an fθ lens and a diffraction optical element 28 constituting a diffracting portion the fθ lens both in the optical casing 21, and a rotary drum 29 constituting an image bearing member outside the optical casing 21.

The laser light L emitted from the light source unit 22 is transmitted by the cylindrical lens 23 and condensed in a linear shape on the reflecting face of the polygon mirror 25, and is deflected by the reflecting faces of the rotating polygon mirror 25. The deflected laser light L is transmitted by the refracting optical element 27 and the diffracting optical element 28 and is emitted from an exit aperture 21a of the optical casing 21, thereby being focused onto a photosensitive member on the rotary drum 29 in a scanning motion in a main scanning direction D.

Figure 16:
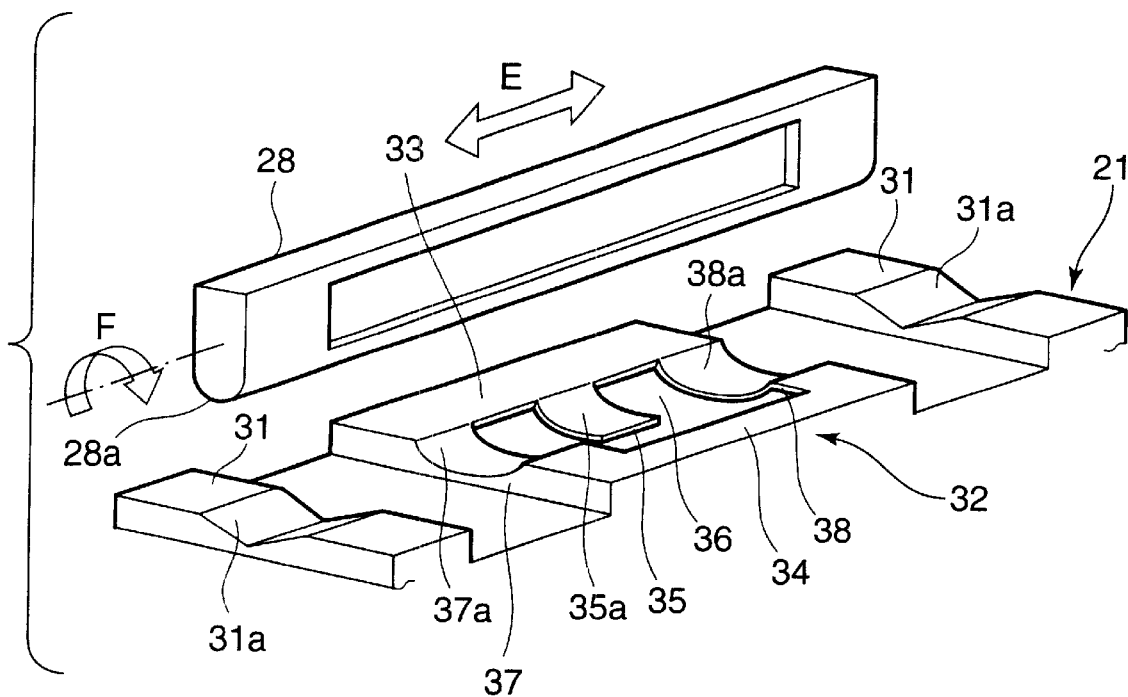
FIG. 16 is a magnified perspective view of the diffraction optical element and its neighborhood prior to mounting in the optical casing.

FIG. 16 is a magnified perspective view of the diffracting optical element 28 and related components prior to the mounting in the optical casing 21. Left and right holding bases 31 for holding the diffracting optical element 28 and an adhesion unit 32 positioned between the holding bases 31 for adhering the diffracting optical element 28 are provided integrally with the optical casing 21. The holding base 31 is provided, on the upper face thereof, with a substantially V-shaped recess portion 31a for accommodating a lower face of an arc-shaped cross section of the diffracting optical element 28.

The adhesion unit 32 is provided with front and rear base portions 33, 34 of a height comparable to that of the holding bases 31, wherein the front base portion 33 is provided with a flexible piece 35 in the form of a beam held at an end, in a position corresponding to the approximate center of the diffracting optical element 28. Between the front and rear base portions 33, 34, there is formed a penetrating portion 36 which is so formed as to separate three sides of the flexible piece 35 from the optical casing 21 and to connect the remaining side of the flexible piece 35 to the base portion 33. Thus the flexible piece 35 is rendered capable of elastic deformation with a fixed end at the side of the base portion 33 and a free end at the opposite side.

The flexible piece 35 is formed for example in a substantially U-shaped form for accommodating the lower face 28a of the diffracting optical element 28, and the left and right base portions 37, 38 positioned on both sides of the flexible piece 35 are provided with upper faces 37a, 38a of a substantially U-shaped form similar to that of the flexible piece 35. When the diffracting optical element 28 is placed on the recess portions 31a of the left and right holding bases 31, there are formed gaps, as will be explained later, between the lower face 28a of the diffracting optical element 28 and the upper faces 35a, 37a, 38a of the adhesion unit 32.

Figure 17:
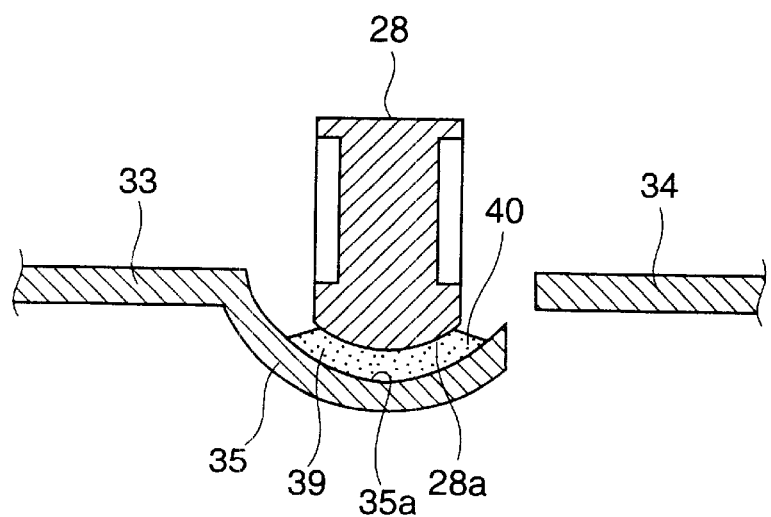
FIG. 17 is a longitudinal cross-sectional view of the diffraction optical element and its neighborhood.
Figure 18:
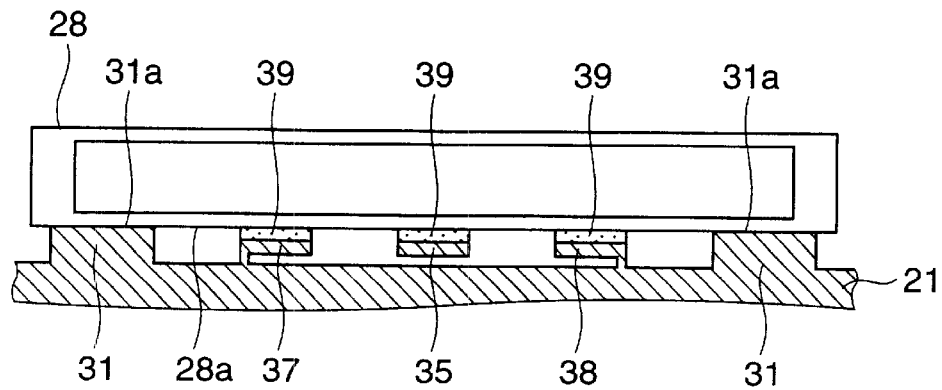
FIG. 18 is a transversal cross-sectional view of the optical casing in the vicinity of the diffraction optical element.

FIG. 17 is a longitudinal cross-sectional view of the diffracting optical element 28 and related components, and FIG. 18 is a transversal cross-sectional view of the optical casing 21 in the vicinity of the diffracting optical element 28. In fixing the diffracting optical element 28 in the optical casing 21, a UV-settable adhesive 39 is at first coated on all the upper faces 35a, 37a, 38a of the adhesion unit 32, and then the diffracting optical element 28 is on the recess portions 31a of the left and right holding bases 31. Thus the gap 40 between the lower face 28a of the diffracting optical element 28 and the upper faces 35a, 37a, 38a of the adhesion unit 32 is filled with the adhesive 39, and the position of the diffracting optical element 28 is adjusted in such state by the following method.

Figure 19:
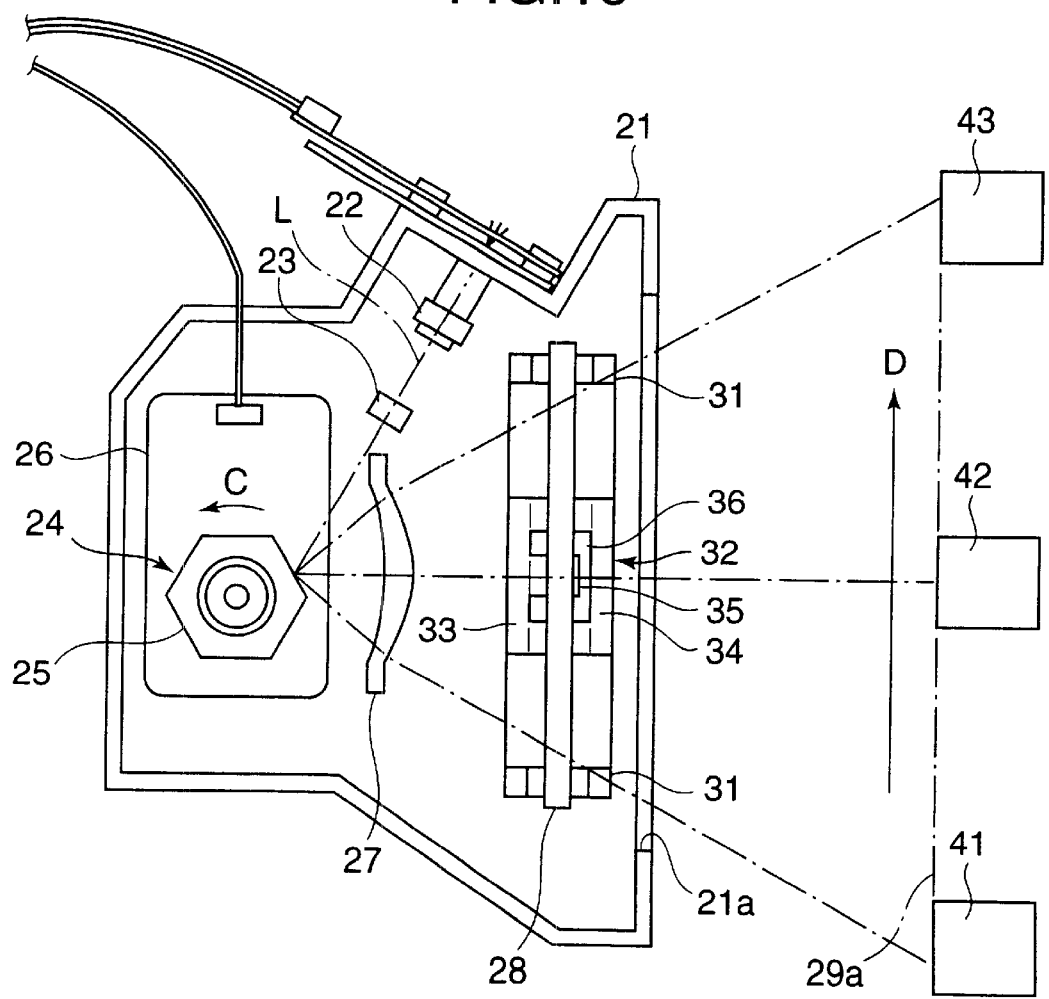
FIG. 19 is a view showing a method for measuring the bending and deviated magnification of the scanning line.

FIG. 19 is a plan view showing a method of measuring and adjusting the biased magnification and the bending of the scanning line, wherein photosensors 41, 42, 43 for detecting the laser light L are provided instead of the rotary drum 29, and the photosensor faces of the photosensors 41, 42, 43 are made to coincide with the surface to be scanned 29a of the rotary drum 29.

In case of correcting the biased magnification of the scanning line, there are measured time required by the laser light L for scanning the distance between the photosensors 41 and 42 and that for scanning the distance between the photosensors 42 and 43. Then these times are compared to determine the difference in the lengths of the scanning line at the left-hand side and the right-hand side with respect to the center of the scanning line in the main scanning direction on the surface to be scanned 29a, namely the biased magnification. Then the diffracting optical element 28 is moved in a direction E in FIG. 16 along the longitudinal axis thereof in such a manner that the magnification becomes same in the left-hand side and the right-hand side.

On the other hand, in case of correcting the bending of the scanning line, the bending is measured as the difference in height of the laser light L entering the external photosensors 41, 43 and the laser light L entering the central photosensor 42 by detecting the position in height of the laser light L entering the photosensors 41, 42, 43 utilizing line sensors arranged vertically therein. Then the diffracting optical element 28 is rotated in a direction F in FIG. 16 about the longitudinal axis thereof so as to reduce the bending of the scanning line.

Figure 20:
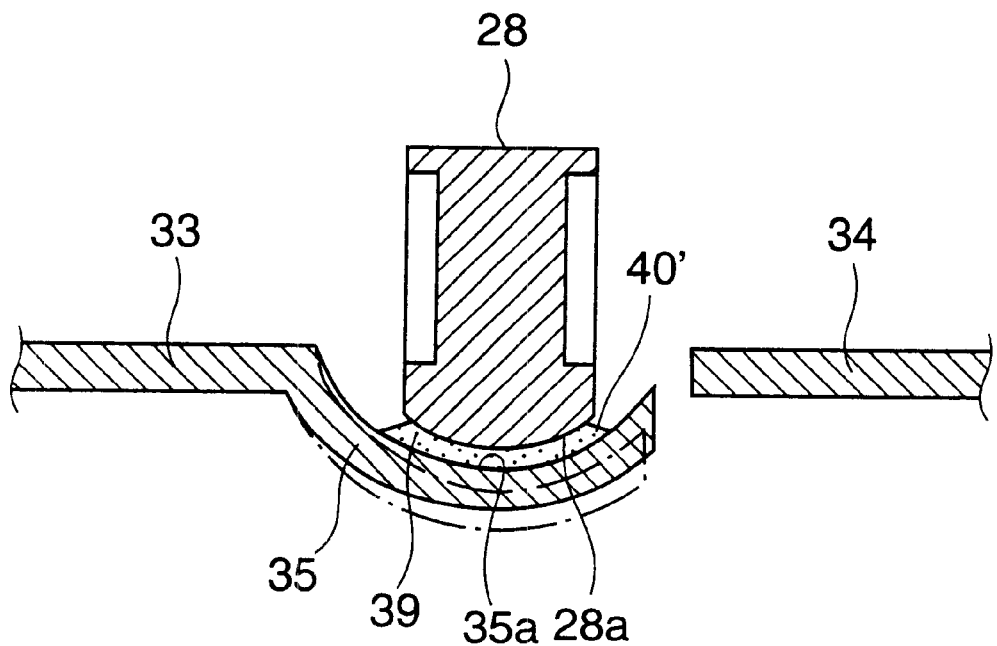
FIG. 20 is a view showing the function of a flexible piece.

After the correction of the biased magnification and bending of the scanning line, the adhesive 39 is irradiated with ultraviolet light from above the diffracting optical element 28 whereby the adhesive 39 solidifies under contraction to adhere the diffracting optical element 28 and the adhesion unit 32. In this case, the flexible piece 35, formed as a beam supported at an end and provided with rigidity lower than that of the diffracting optical element 28, performs elastic deformation about a fulcrum at the fixed end. Thus, as shown in FIG. 20, the flexible piece 35 executes elastic deformation from a broken-lined position with a gap 40 to a solid-line position with a narrower gap 40', thereby retaining the predetermined position of the diffracting optical element 28 which has been corrected for the bending and biased magnification of the scanning line.

In the fourth embodiment, as explained in the foregoing, the flexible piece 35 is provided by forming the penetrating portion 36 in the optical casing 21, whereby the flexible piece 35 executes elastic deformation when the adhesive 39 between the diffracting optical element 28 and the flexible piece 35 hardens with contraction, thereby preventing the diffracting optical element 28 from deformation or from any change in the position thereof. It is thus rendered possible to securely fix the diffracting optical element 28 in the optical casing 21 in the predetermined position, thereby allowing to form a high definition image.

Figure 21:
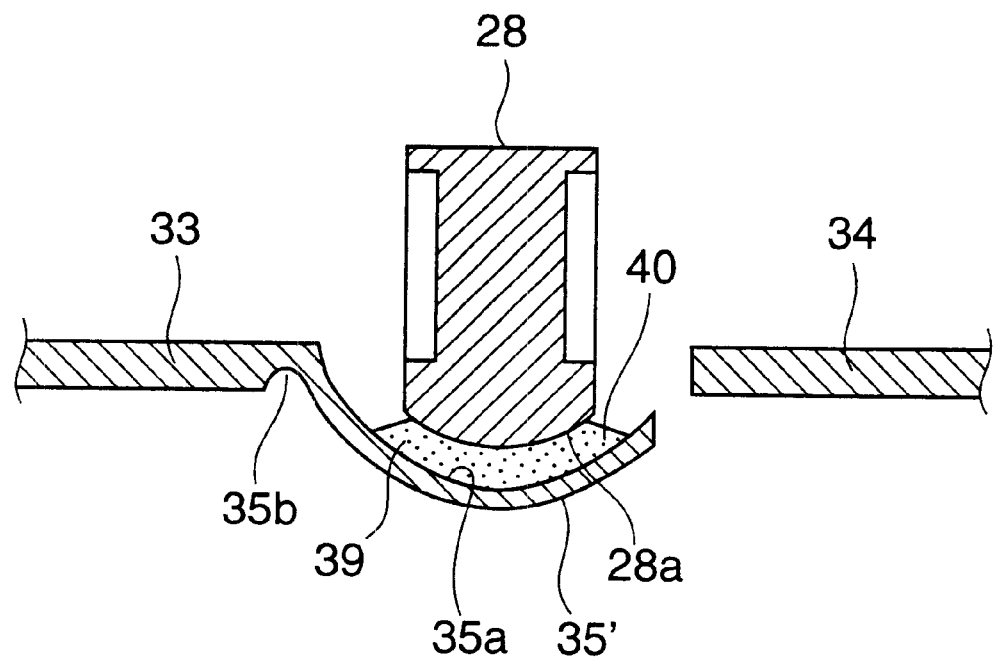
FIG. 21 is a longitudinal cross-sectional view of a diffraction optical element and its neighborhood in a fifth embodiment.

FIG. 21 is a longitudinal cross-sectional view of the diffracting optical element 28 and related components in a fifth embodiment, wherein a flexible piece 35' is generally made thinner than the flexible piece 35 in the fourth embodiment, and a groove 35b is formed at the fixed end of the flexible piece 35' thereby locally reducing the thickness of the fixed end.

In the fifth embodiment, the rigidity of the flexible piece 35' can be adjusted by suitably selecting one or more of the thickness of the flexible piece 35', size of the groove 35b, size of the gap 40 filling amount of the adhesive 39, and surface area of the flexible piece 35'. It is thus possible to deform the flexible piece 35' by an amount same as the contracting amount of the adhesive 39, so as to maintain the diffracting optical element 28 free from any stress, thus achieving a result better than in the fourth embodiment.

The foregoing fourth and fifth embodiments employ the UV-settable adhesive 39, but there may also be employed other adhesive.

The present invention is not limited by the foregoing embodiment but is subjected to various modifications within the scope and spirit of the appended claims.

What is claimed is:

1. An image scanning apparatus comprising:
   deflection means for deflecting light emitted from a light emitting source;
   a lens for guiding the light deflected by said deflection means to a surface to be scanned; and
   a holding base for holding said lens, said holding base being provided with a recess portion,
   wherein said lens has a curved surface portion, which is curved in a direction perpendicular to a main-scanning direction of said deflection means, provided along an entire side of said lens in the main-scanning direction of said deflection means, and
   wherein said holding base holds the curved surface portion of said lens by the recess portion.

2. An image scanning apparatus according to claim 1, wherein said recess portion is a substantially V-shaped groove or a substantially U-shaped groove.

3. An image scanning apparatus according to claim 1, wherein said lens is fixed to said holding base with an adhesive.

4. An image scanning apparatus according to claim 1, wherein said lens is a molded plastic object.

5. An image scanning apparatus according to claim 1, wherein said lens is a diffracting optical element.

* * * * *